United States Patent
Gong et al.

(10) Patent No.: US 8,475,156 B2
(45) Date of Patent: Jul. 2, 2013

(54) INJECTION MOLD

(75) Inventors: Wen-Peng Gong, New Taipei (TW);
Xiao-Ping Wu, New Taipei (TW);
Kun-Hsueh Chiang, New Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 337 days.

(21) Appl. No.: 13/070,621

(22) Filed: Mar. 24, 2011

(65) Prior Publication Data

US 2012/0244238 A1 Sep. 27, 2012

(51) Int. Cl.
*B29C 45/44* (2006.01)

(52) U.S. Cl.
USPC ..... 425/556; 425/438; 425/577; 425/DIG. 58

(58) Field of Classification Search
USPC ............ 425/438, 556, 577, DIG. 58; 264/334
See application file for complete search history.

(56) References Cited

U.S. PATENT DOCUMENTS

| | | | |
|---|---|---|---|
| 3,060,509 A * | 10/1962 | McCubbins, Jr. | 425/577 |
| 3,811,645 A * | 5/1974 | Feist | 249/68 |
| 4,768,747 A * | 9/1988 | Williams et al. | 249/63 |
| 5,281,127 A * | 1/1994 | Ramsey | 425/556 |
| 5,316,467 A * | 5/1994 | Starkey | 425/438 |
| 5,773,048 A * | 6/1998 | Ramsey | 425/556 |
| 5,814,357 A * | 9/1998 | Boskovic | 425/556 |
| 6,039,558 A * | 3/2000 | Park et al. | 425/556 |
| 6,474,977 B1 * | 11/2002 | Wimmer | 425/556 |
| 6,491,513 B1 * | 12/2002 | Schneider | 425/577 |
| 7,435,079 B2 * | 10/2008 | Wang et al. | 425/577 |
| 8,226,404 B2 * | 7/2012 | Sorimoto | 425/577 |
| 8,342,838 B2 * | 1/2013 | Wu et al. | 425/556 |
| 2002/0086080 A1 * | 7/2002 | Manera | 425/438 |
| 2004/0109913 A1 * | 6/2004 | Drees | 425/556 |
| 2006/0012078 A1 * | 1/2006 | Sutter | 264/334 |
| 2007/0243286 A1 * | 10/2007 | Wang et al. | 425/577 |
| 2010/0278963 A1 * | 11/2010 | Ni et al. | 425/556 |
| 2011/0003027 A1 * | 1/2011 | Navarra Pruna | 425/556 |
| 2011/0262583 A1 * | 10/2011 | Lin | 425/556 |
| 2012/0107440 A1 * | 5/2012 | Li et al. | 425/441 |
| 2012/0244238 A1 * | 9/2012 | Gong et al. | 425/161 |

* cited by examiner

*Primary Examiner* — Yogendra Gupta
*Assistant Examiner* — Emmanuel S Luk
(74) *Attorney, Agent, or Firm* — WPAT, P.C.; Anthony King

(57) ABSTRACT

An injection mold for molding a product having a hook portion includes a stationary mold, a return pin, a movable mold, an ejector mechanism and a plurality of ejector pins for ejecting the product out of the injection mold. The movable mold defines an inserting perforation, a receiving groove and a receiving gap. The ejector mechanism includes a slide block located in the receiving groove, a supporting bar stretching into the receiving groove, and an inclined ejector pin having a tail at a top thereof movably inserted in the inserting perforation and fastened on the slide block. The slide block is pressed downward by the return pin when the injection mold is closed. When the injection mold is opened, the slide block drives the inclined ejector pin to move upward and sideward under an upward push of the supporting bar to make the hook portion parted from the tail.

4 Claims, 2 Drawing Sheets

INJECTION MOLD

BACKGROUND OF THE INVENTION

1. Field of the Invention

The present invention generally relates to an injection mold, and more particularly to an injection mold capable of ejecting a product out effectively.

2. The Related Art

Generally, a conventional injection mold for molding a product which has a substantially L-shaped hook portion at one end thereof includes a stationary mold, a movable mold and an inverted-L shaped ejector pin movably disposed in the movable mold. When the injection mold is closed, a shaping cavity for molding the product is formed among the stationary mold, the movable mold and the inverted-L shaped ejector pin. When the injection mold is opened, the inverted-L shaped ejector pin is driven to vertically move upward to eject the product out of the movable mold. Then the product is further parted from the inverted-L shaped ejector pin by other auxiliary jigs. However, because the inverted-L shaped ejector pin ejects the product by means of moving vertically, a displacement that the inverted-L shaped ejector pin moves in a vertical direction is greater to facilitate the product to be parted from the inverted-L shaped ejector pin by the auxiliary jigs. So a larger space is occupied by the injection mold. Furthermore, the auxiliary jigs are needed to part the product from the inverted-L shaped ejector pin that increases the cost of manufacturing the product. As a result, production efficiency of the product is lowered.

SUMMARY OF THE INVENTION

An object of the present invention is to provide an injection mold for molding a product having a hook portion. The injection mold includes a stationary mold, a return pin, a movable mold, an ejector mechanism and a plurality of ejector pins. The stationary mold defines a sprue channel. The return pin is vertically fastened in the stationary mold and has a bottom end thereof projected under the stationary mold. The movable mold is positioned under the stationary mold when the injection mold is closed. A shaping cavity is defined between the stationary mold and the movable mold and connected with the sprue channel for molding the product. The movable mold defines an inserting perforation extending slantwise to make a top end thereof connected with the shaping cavity, and a receiving groove connected with a bottom end of the inserting perforation. A top end of the inserting perforation is further extended sideward to form a receiving gap communicating with the shaping cavity. The inserting perforation is inclined towards the same direction as the extended direction of the receiving gap from the top end to the bottom end thereof. The movable mold further defines a guiding hole vertically extended to penetrate through a top of the movable mold. The guiding hole has a bottom end connected with the receiving groove. The bottom end of the return pin stretches into the receiving groove through the guiding hole. The ejector mechanism includes a slide block movably located in the receiving groove, a supporting bar vertically and movably inserted in the movable mold and further stretching into the receiving groove to prop against a bottom of the slide block, and an inclined ejector pin having a tail at a top thereof. The inclined ejector pin is movably inserted in the inserting perforation with a bottom thereof being fastened on the slide block. The slide block is pressed downward by the return pin to make the tail of the inclined ejector pin received in the receiving gap when the injection mold is closed. Outsides of the tail are spaced from insides of the receiving gap to mold the hook portion of the product thereamong. When the injection mold is opened, the slide block drives the inclined ejector pin to move upward and sideward along the inserting perforation under an upward push of the supporting bar so as to make the hook portion of the product parted from the tail of the inclined ejector pin. The ejector pins are movably inserted in the movable mold for ejecting upward the product out of the injection mold.

As described above, when the product is ejected out of the movable mold, the inclined ejector pin slides upward and sideward along the inserting perforation to make the tail of the inclined ejector pin easily parted from the hook portion of the product. So the product can be effectively ejected out of the movable mold without auxiliary jigs so as to ensure the production of the product and further reduce the cost of manufacturing the product. Furthermore, the ejector mechanism decreases a displacement of the inclined ejector pin moving in the vertical direction, so that reduces an occupied area of the injection mold. By this way, production efficiency of the product can be improved.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
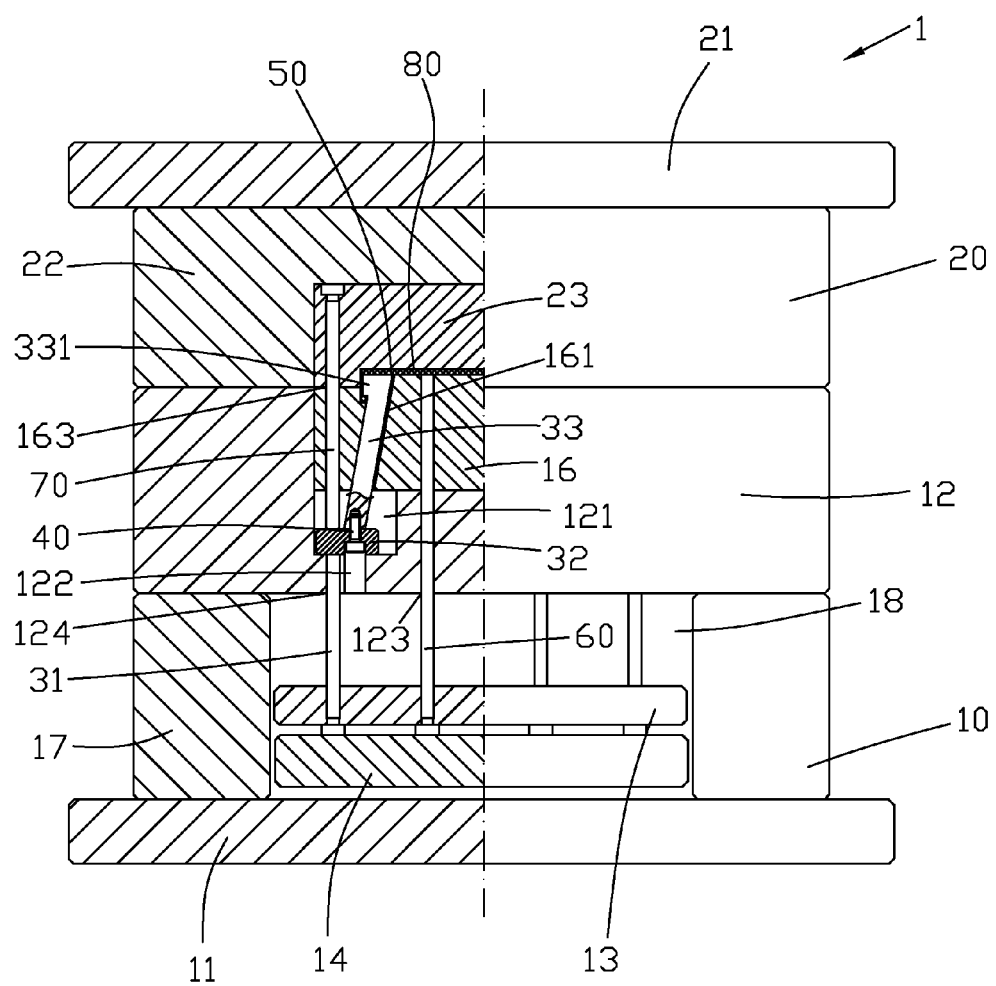
FIG. 1 is a sectional view of an injection mold according to the present invention, wherein the injection mold is closed with a product being molded therein.
Figure 2:
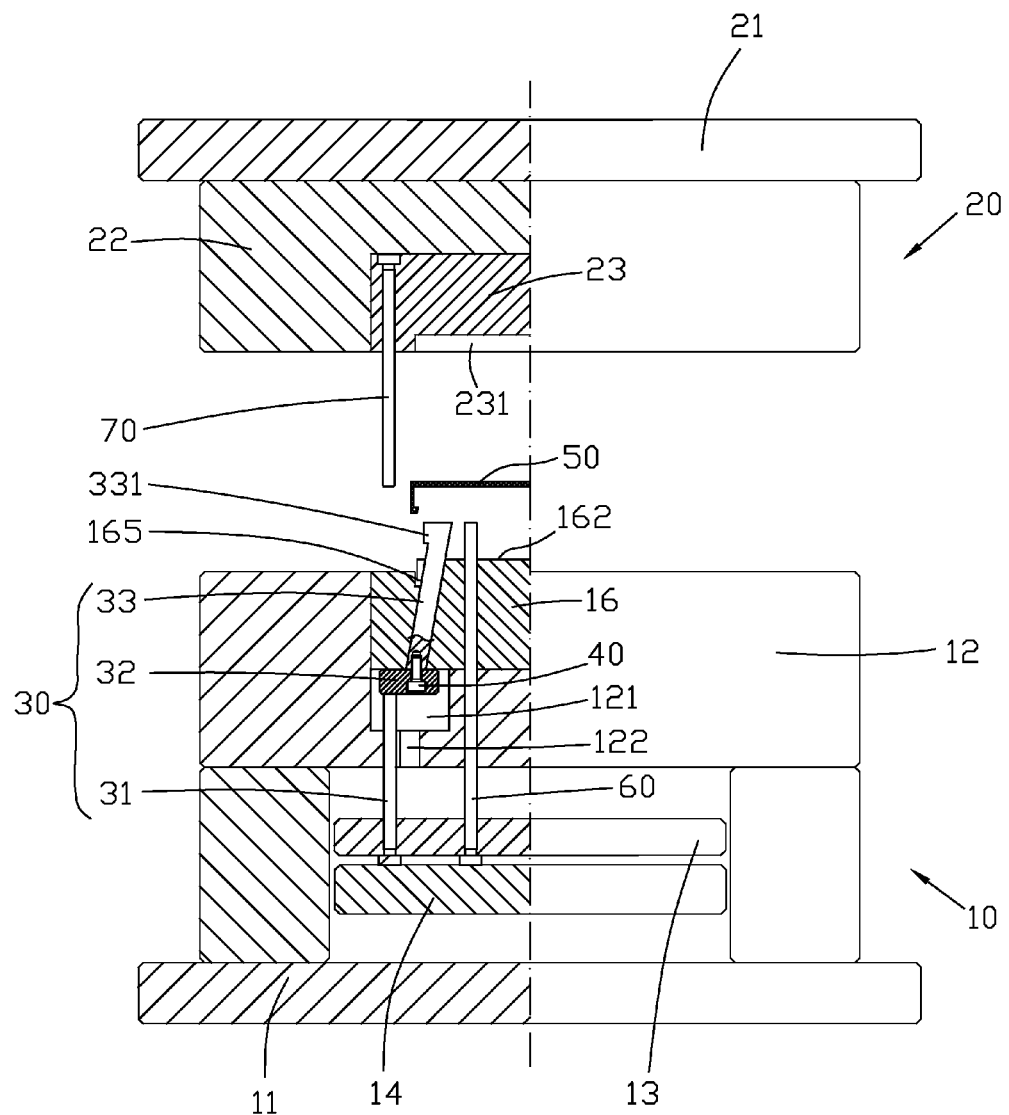
FIG. 2 is a sectional view of the injection mold of FIG. 1, wherein the injection mold is opened with the product being ejected out therefrom.

Referring to FIGS. 1-2, an embodiment of an injection mold 1 according to the present invention is shown. The injection mold 1 adapted for molding a product 50 includes a movable mold 10, a stationary mold 20, an ejector mechanism 30, a plurality of ejector pins 60 and a return pin 70.

Referring to FIGS. 1-2, the movable mold 10 includes a movable fixing plate 11, a movable plate 12, an ejector pin plate 13, an ejector pin fixing plate 14, a movable core 16 and two support blocks 17. The movable fixing plate 11 is disposed levelly. The support blocks 17 are mounted on two opposite sides of a top of the movable fixing plate 11 and spaced from each other. The movable plate 12 is mounted on tops of the two support blocks 17. A space 18 is formed among the movable fixing plate 11, the two support blocks 17 and the movable plate 12. The ejector pin fixing plate 14 is located in the space 18 and above the movable fixing plate 11. The ejector pin plate 13 is mounted above the ejector pin fixing plate 14. The ejector pin fixing plate 14 and the ejector pin plate 13 can together move upward and downward in the space 18. A top of the movable plate 12 defines a first groove (not shown) to receive the movable core 16 therein. A side of a bottom of the first groove extends downward to form a receiving groove 121. A middle of a bottom of the receiving groove 121 extends downward to form a through-hole 122 vertically penetrating through the movable plate 12. A bottom of the movable plate 12 defines an inserting hole 124 adjacent to the through-hole 122 and extending vertically to connect with the bottom of the receiving groove 121 and the space 18. A top of the movable core 16 protrudes upward to form a protrusion 162 beyond the top of the movable plate 12. The movable plate 12 defines a plurality of ejector pin holes 123 vertically penetrating through the movable plate 12, the movable core 16 and the protrusion 162 to communicate with the space 18 for receiving the ejector pins 60 respectively. The movable core 16 defines an inserting perforation 161 extending slantwise to penetrate through a top of the protrusion 162 and a bottom of the movable core 16, with a bottom end thereof connected with the receiving groove 121. The inserting perforation 161 has a top end further extended sideward to penetrate through a side of the protrusion 162 to form a receiving gap 165. The inserting perforation 161 is inclined towards the same direction as the extended direction of the receiving gap 165 from the top end to the bottom end of the inserting perforation 161. So there is an acute angle between the receiving gap 165 and the inserting perforation 161. The movable core 16 further defines a guiding hole 163 vertically penetrating therethrough to communicate with the receiving groove 121 and spaced from the inserting perforation 161, the receiving gap 165 and the protrusion 162.

Referring to FIGS. 1-2 again, the stationary mold 20 includes a stationary fixing plate 21, a stationary plate 22 and a stationary core 23. The stationary plate 22 is mounted to a bottom of the stationary fixing plate 21. A bottom of the stationary plate 22 defines a second groove (not shown) for receiving the stationary core 23 therein. A bottom of the stationary core 23 defines a receiving cavity 231 facing to the protrusion 162. The stationary mold 20 defines a sprue channel (not shown).

Referring to FIGS. 1-2, bottom ends of the ejector pins 60 are fastened to the ejector pin plate 13 and the ejector pin fixing plate 14, and top ends of the ejector pins 60 penetrate through the ejector pin plate 13 to be movably inserted in the ejector pin holes 123 respectively. The return pin 70 is vertically fastened in the stationary core 23, with a bottom end thereof projected under the stationary core 23.

Referring to FIGS. 1-2, the ejector mechanism 30 includes a supporting bar 31, a slide block 32 and an inclined ejector pin 33. The slide block 32 is movably located in the receiving groove 121. A bottom end of the supporting bar 31 is fastened to the ejector pin plate 13 and the ejector pin fixing plate 14, and a top end of the supporting bar 31 passes through the inserting hole 124 to abut against a bottom of the slide block 32. The inclined ejector pin 33 is movably inserted in the inserting perforation 161 with a bottom thereof being fastened on the slide block 32 by means of a screw 40, wherein the screw 40 passes through the through-hole 122 to screw the slide block 32 and the bottom of the inclined ejector pin 33 together. A top of the inclined ejector pin 33 is level with tops of the ejector pins 60, and further protruded sideward to form a tail 331. The ejector pin fixing plate 14 and the ejector pin plate 13 can move upward and downward in the space 18 to drive the ejector pins 60 and the supporting bar 31 to move upward and downward along the ejector pin holes 123 and the inserting hole 124 respectively. The supporting bar 31 moves upward to prop the slide block 32 upward so as to further drive the inclined ejector pin 33 to move upward and sideward along the inserting perforation 161.

Referring to FIGS. 1-2, the stationary mold 20 is positioned over the movable mold 10. When the injection mold 1 is closed, the protrusion 162 and the top of the inclined ejector pin 33 are received in the receiving cavity 231 with the tops of the protrusion 162, the ejector pins 60 and the inclined ejector pin 33 kept level with one another. The tail 331 of the inclined ejector pin 33 is received in the receiving gap 165. The tops of the protrusion 162, the ejector pins 60 and the inclined ejector pin 33 and outsides of the tail 331 are spaced from insides of the receiving cavity 231 and the receiving gap 165 to define a shaping cavity 80 thereamong connected with the sprue channel. In the process of the injection mold 1 being closed, the bottom end of the return pin 70 is inserted into and further passes through the guiding hole 163 to abut against a top of the slide block 32 so as to drive the slide block 32 to move downward in the receiving groove 121. In the meantime, the slide block 32 presses the supporting bar 31 downward to make the ejector pin fixing plate 14 and the ejector pin plate 13 move downward in the space 18. So the ejector pins 60 and the inclined ejector pin 33 are driven to make the tops thereof level with the top of the protrusion 162, when the injection mold 1 is at the closed position. Then thermoplastic resins are injected into the shaping cavity 80 through the sprue channel, and further solidified for a predetermined time to form the product 50 which has a substantially L-shaped hook portion formed at one end thereof.

Referring to FIGS. 1-2, when the injection mold 1 is opened, the ejector pin fixing plate 14 and the ejector pin plate 13 are pushed upward in the space 18 to drive the supporting bar 31 to push the slide block 32 upward so as to make the inclined ejector pin 33 slantwise move upward along the inserting perforation 161. At the same time, the ejector pins 60 are also driven by the ejector pin fixing plate 14 and the ejector pin plate 13 to move upward along the corresponding ejector pin holes 123. So, the inclined ejector pin 33 and the ejector pins 60 together eject the product 50 out of the movable mold 10. Moreover, the inclined ejector pin 33 is movably positioned in the inserting perforation 161 at an angle, so the inclined ejector pin 33 is easily parted from the hook portion of the product 50 without other auxiliary jigs. As a result, the product 50 can be ejected out of the movable mold 10 effectively to ensure a production of the product 50.

As described above, when the product 50 is ejected out of the movable mold 10, the inclined ejector pin 33 slides upward and sideward along the inserting perforation 161 to make the tail 331 of the inclined ejector pin 33 easily parted from the hook portion of the product 50. So the product 50 can be effectively ejected out of the movable mold 10 without the auxiliary jigs so as to ensure the production of the product 50 and further reduce the cost of manufacturing the product 50. Furthermore, the ejector mechanism 30 decreases a displacement of the inclined ejector pin 33 moving in the vertical direction, so that reduces an occupied area of the injection mold 1. As a result, production efficiency of the product 50 is improved.

What is claimed is:

1. An injection mold for molding a product having a hook portion, comprising:
a stationary mold defining a sprue channel;
a return pin vertically fastened in the stationary mold and having a bottom end thereof projected under the stationary mold;
a movable mold positioned under the stationary mold when the injection mold is closed, a shaping cavity being defined between the stationary mold and the movable mold and connected with the sprue channel for molding the product, the movable mold defining an inserting perforation extending slantwise to make a top end thereof connected with the shaping cavity, and a receiving groove connected with a bottom end of the inserting perforation, a top end of the inserting perforation being further extended sideward to form a receiving gap communicating with the shaping cavity, the inserting perforation being inclined towards the same direction as the extended direction of the receiving gap from the top end to the bottom end thereof, the movable mold further defining a guiding hole vertically extended to penetrate through a top of the movable mold, the guiding hole having a bottom end connected with the receiving groove, the bottom end of the return pin stretching into the receiving groove through the guiding hole;

an ejector mechanism including a slide block movably located in the receiving groove, a supporting bar vertically and movably inserted in the movable mold and further stretching into the receiving groove to prop against a bottom of the slide block, and an inclined ejector pin having a tail at a top thereof, the inclined ejector pin being movably inserted in the inserting perforation with a bottom thereof being fastened on the slide block, wherein the slide block is pressed downward by the return pin to make the tail of the inclined ejector pin received in the receiving gap when the injection mold is closed, outsides of the tail are spaced from insides of the receiving gap to mold the hook portion of the product thereamong, when the injection mold is opened, the slide block drives the inclined ejector pin to move upward and sideward along the inserting perforation under an upward push of the supporting bar so as to make the hook portion of the product parted from the tail of the inclined ejector pin; and a plurality of ejector pins movably inserted in the movable mold for ejecting upward the product out of the injection mold.

2. The injection mold as claimed in claim 1, wherein the bottom of the inclined ejector pin is fastened on the slide block by means of a screw.

3. The injection mold as claimed in claim 1, wherein the top of the movable mold defines a protrusion protruded upward, the inserting perforation and the receiving gap further penetrate upward through the protrusion, a receiving cavity is opened in a bottom of the stationary mold, tops of the protrusion, the ejector pins and the inclined ejector pin are received in the receiving cavity and spaced from insides of the receiving cavity to define the shaping cavity therebetween when the injection mold is closed.

4. The injection mold as claimed in claim 1, wherein the movable mold includes an ejector pin plate and an ejector pin fixing plate of which both are superimposed together and movably located in a space defined in a bottom of the movable mold, bottom ends of the supporting bar and the ejector pins are fastened to the ejector pin plate and the ejector pin fixing plate, the ejector pin fixing plate and the ejector pin plate can move upward and downward in the space to drive the ejector pins and the supporting bar to move upward and downward.

\* \* \* \* \*